United States Patent [19]

Buckley

[11] 4,050,508

[45] Sept. 27, 1977

[54] CONTROLLABLE HEAT TRANSMISSION PANELS

[75] Inventor: Bruce Shawn Buckley, Cambridge, Mass.

[73] Assignee: Massachusetts Institute of Technology, Cambridge, Mass.

[21] Appl. No.: 626,402

[22] Filed: Oct. 28, 1975

[51] Int. Cl.² .......................... F24J 3/02; F28D 21/00
[52] U.S. Cl. ........................................ 165/32; 165/49; 165/106
[58] Field of Search ..................... 165/32, 39, 40, 49, 165/106

[56] References Cited

U.S. PATENT DOCUMENTS

| | | |
|---|---|---|
| 1,900,715 | 3/1933 | Jaeger ............................... 165/106 X |
| 3,563,305 | 2/1971 | Hay .................................... 165/49 X |
| 3,625,279 | 12/1971 | Mayo ................................. 165/65 X |

*Primary Examiner*—Edgar W. Geoghegan
*Attorney, Agent, or Firm*—Arthur A. Smith, Jr.; Robert Shaw

[57] ABSTRACT

A controllable heat-transmission device, herein called a thermic device or panel, uses temperature changes to modulate heat flow between two regions. A fluid, in thermal contact with both regions, varies its non-radiative heat transfer in response to the temperature of either or both regions. The variation in heat transfer is due only to the thermal energy of the two regions; no other energy is required.

21 Claims, 6 Drawing Figures

CONTROLLABLE HEAT TRANSMISSION PANELS

The invention herein described was made in the course of work performed under a grant from the National Science Foundation, an agency of the United States Government.

The present invention relates to controllable heat transmission apparatus to modulate heat flow between two regions and, more particularly, to apparatus that needs only the temperatures at the two regions to effect modulation.

By way of background, attention is called to an application for Letters Patent Ser. No. 588,093, filed by the present invention on June 18, 1975.

The term "thermics" is used herein to denote a class of devices which, for example, can be used to modulate energy transfer between two closely-spaced regions such as the outside environment and the inside of a building to effect heating or cooling of the building and which require only the heat energy of the two regions to effect such modulation. Thermic devices are and include thermal logic elements that permit selective flow of a fluid within the device and by such selective flow control the flow of energy between the two regions. In the thermic systems of the present invention heat is transmitted between the two closely-spaced regions transversely through or across the thermic device; and such heat transmission is affected by a fluid medium which moves or flows within the device and modulates heat transmission thereby. The fluid flow is regulated on the basis of a temperature parameter that can be the temperature of either region or a differential between the two regions. In those instances in which the temperature parameter is the temperature differential between the two regions, and energy transfer between the regions is a function of the differential and hence the temperature parameter, but more than that it is a function of the fluid flow within the thermic device, as hereinafter explained in greater detail, and is dependent solely on the convective and conductive properties of the fluid, without any change of state thereof and, most importantly, using only thermal energy. Said another way, the energy transfer between the two regions is regulated on the basis of the temperature parameters, but that regulation is indirect: the direct effect occurs through the fluid itself. Furthermore, in the systems hereinafter described, fluid flow in the device is affected by a mechanism in each system that is other than the character of the fluid itself; that is, a valving scheme or control mechanism is employed to perform the regulation function, and the mechanism used is activated by thermal energy. The valving scheme acts automatically to provide the regulating function through control of movement of fluid within the device.

Accordingly, it is an object of the present invention to provide a novel thermic device.

Another object is to provide such device in the form of a thermic panel which may form or be part of the outside surface of a building and which serves to affect energy transmission between the inside of the building and the outside environment.

Still another object is to provide a thermic panel that can be retrofitted to existing buildings.

These and still further objects are discussed hereinafter and are more particularly pointed out in the appended claims.

The foregoing objects are achieved by apparatus for controlling energy transmission between two closely-spaced regions in a system, that includes an isolating structure disposed in the space between the two closely-spaced regions, a liquid disposed within said structure and adapted to flow or move therein, and control means other than the character of the liquid itself, responsive to a temperature parameter of the system and using only thermal energy, acting to control automatically the movement of the flow in said structure, said liquid, solely by virtue of the convective and conductive properties of the liquid, using only thermal energy and without change of state thereof, acting to modulate the energy transmission between the two closely-spaced regions of the system, said isolating structure comprising a thermal insulator interposed between the two regions and serving to divide the isolating structure into a first section adjacent the first region of the two regions and a second section adjacent the second region of the two regions, said liquid being disposed within the first section and the second section and adapted to flow by convective flow from one to the other of the two sections, the control means acting to affect said convective flow; and a heat transfer mechanism that comprises fluid means whereby a fluid is caused to flow adjacent to said second section to exchange energy with the liquid in said second section by, for example, an external impeller.

The invention is hereinafter described with reference to the accompanying drawing in which.

Figure 1:
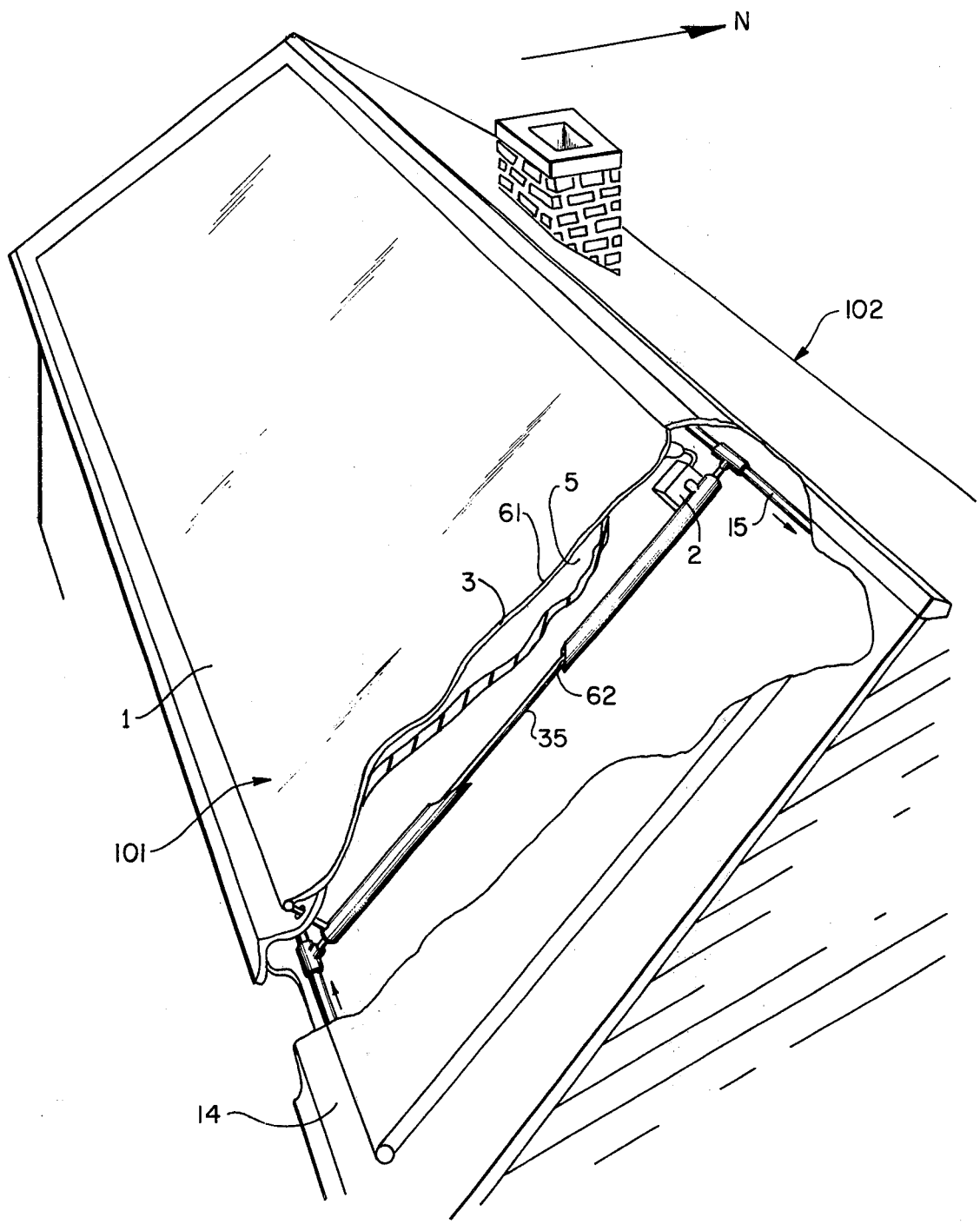
FIG. 1 is an isometric view, partly cutaway, showing a system that embodies the present invention.

Turning now to FIG. 1, apparatus is shown at 101 for controlling energy transmission between two closely-spaced regions. The apparatus or thermic system 101 is part of a building 102 and serves to modulate energy transmission between the inside of the building and the outside of the building. More specifically, in the system now to be described, the apparatus 101 acts to transmit energy from the outside environment into the building to heat the building, but it can serve, as well, to transmit energy from the building in a cooling mode.

The apparatus 101 comprises an isolating structure or panel 1 disposed in the space between the two closely-spaced regions, that is, the outside environment and the inside of the building. To place this explanation in context, the panel 1 will usually be the order of ten inches or less in thickness. A first fluid 3, which is usually water, is disposed within the isolating structure 1 and is adapted to flow or move therein; control means 2 responsive to a temperature parameter of the system (e.g., the temperature differential between the outside environment and the temperature inside the building 102) and using only thermal energy, acting to control automatically movement of fluid flow in the panel 1, the liquid 3, solely by virtue of the convective and conductive properties thereof, using only thermal energy and without change of state thereof, acting to modulate the energy transmission between the outside environment and the inside of the building. Before completing the description of the thermic system 101 in FIG. 1, there now follows a more complete explanation of the isolating panel with reference to FIG. 3 wherein the isolating panel is labeled 1A, the water 3A, the control means is shown as liquid valves 2A and 11A and the thermic system is marked 101A.

Figure 3:
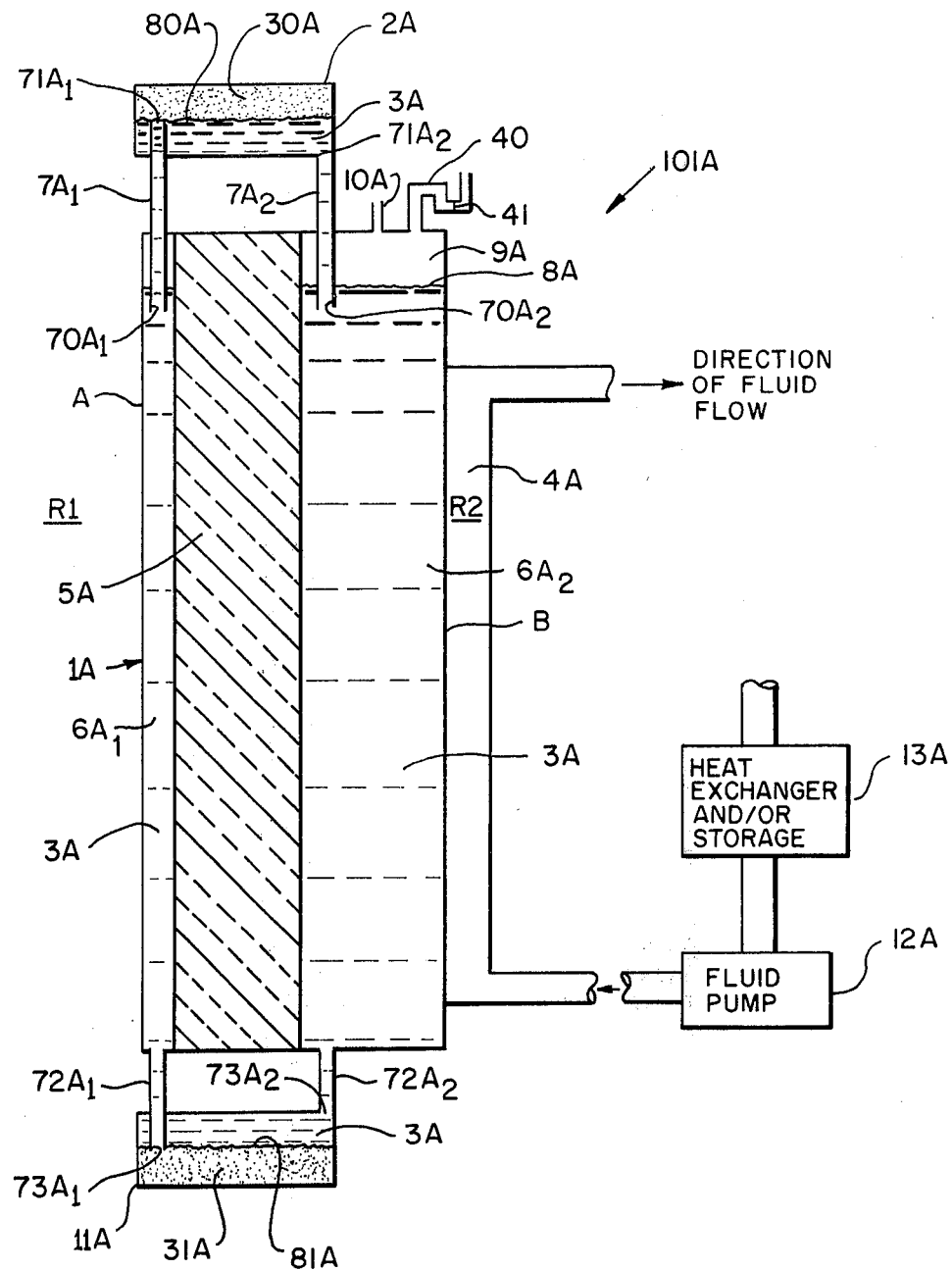
FIG. 3 is a side elevation, schematic in form, of a system that is in a borad way like the systems in both FIG. 1 and FIG. 2 and is intended to detail important facets of the invention.

In FIG. 3, the outside environment is marked $R_1$, the outside surface of the panel 1A is marked A and its inside surface B; the space adjacent the side B is marked $R_2$. The system 101A contains a second fluid 4A that may be gas or liquid and that serves to extract energy from the liquid 3A and transfer the same to the building 102 or to storage, noted in later paragraphs. The panel 1A includes a thermal insulator 5A interposed between the two regions $R_1$ and $R_2$ and serving to divide the panel into a first section $6A_1$ adjacent the first region $R_1$ and a second section $6A_2$ adjacent or near the second region $R_2$. The liquid 3A is disposed within the first section $6A_1$ and the second section $6A_2$ and is adapted to flow by convective flow from one to the other of the two sections $6A_1$ and $6A_2$ under the control of the liquid valve 2A. More specifically, in the system of FIG. 3 when the water in the section $6A_1$ is hotter than the water in the section $6A_2$, water flow will occur from the section $6A_1$ up through the tube or duct labeled $7A_1$ into the body of the valve 2A and thence through the tube or duct labeled $7A_2$ to section $6A_2$ by siphoning action. In this connection, the tubes $7A_1$ and $7A_2$ must always be long enough to be below the lowest level of the upper surface of the water 3A in said two sections, which upper surface is marked 8A in the figure. An air space 9A is provided above the surface 8A, and the airspace 9A is vented to the atmosphere through an aperture 10A. If the panel 1A were not vented, there could be pressure build-up which could rupture the panel; hence, in the absence of a vent, the panel 1A is made of a material which will flex to permit expansion of the liquid 3A or a properly sized air chamber 9A can be provided. Return flow is through the liquid valve 11A; both valves act as diodes, that is, they permit easy flow in one direction but little flow in the other, as now explained.

The valve 2A permits flow of water in the clockwise direction, but not in the counterclockwise direction; the valve 11A permits flow in the cunterclockwise direction, but not in the clockwise direction. Clockwise water flow provides transfer of heat from $R_1$ to $R_2$ for cold weather operation and counterclockwise water flow provides transfer of heat from $R_2$ to $R_1$ for warm weather operation. During cold-weather operation, the valve 11A is rendered inoperative (by, say, removing the liquid marked 31A) and during warm weather the valve 2A is rendered inoperative (by, say, removing the liquid marked 30A).

The lowermost end of the ducts $7A_1$ and $7A_2$, marked $70A_1$ and $70A_2$, respectively, as above indicated must extend below the upper level 8A of the liquid 3A at all times in operation of the panel 1A; on the other hand the upper end shown at $71A_1$ of the duct $7A_1$ must extend above the upper surface shown at 80A of the liquid 3A and into a liquid 30A (e.g., oil) that is lighter than the liquid 3A and the upper end shown at $71A_2$ of the duct $7A_2$ must be below the surface 80A. In this way a buoyancy-induced difference in pressure, such as would be caused, for example, by a small increase in head in the liquid 3A in the section $6A_1$, will cause the liquid 3A to flow from the section $6A_1$ and through the liquid valve 2A to the section $6A_2$.

If, on the other hand, the liquid level 8A in the section $6A_2$ rises above that of the section $6A_1$, liquid flow will be through the liquid valve 11A, as now explained. The liquid valve 11A includes the liquid 31A and the liquid 3A with an interface 81A therebetween. Liquid flow between the two sections is down through a duct $72A_1$ into the valve 11A and up through a duct $72A_2$. As shown, the lowermost end labeled $73A_1$ of the duct $72A_1$ extends down into the liquid 31A (which is heavier than the liquid 3A, e.g., indicator fluid) and the lowermost end labeled $73A_2$ of the duct $72A_2$ is in the liquid 3A.

It will be appreciated, on the basis of the explanation in the previous two paragraphs, that the liquid valves 2A and 11A are one-way valves: the liquid 30A allows the liquid 3A to exit from the end $71A_1$ but not to enter that end, and the liquid 31A permits the liquid 3A to exit the end $72A_1$ but not to enter that end. The flow is due to a buoyancy-induced difference in pressure between the two sections, not to the absolute pressure therein.

The panel 1A is vertically oriented, the thermal insulator 5A is impenetrable to the liquid 3A at all portions thereof except at or near its upper portion and at or near its lower portion, that is, the one-way valves 2A and 11A, in effect, render the insulator selectively pervious to the water 3A at or near the upper and lower ends of the insulator. Other schemes for effecting such selective flow may be used, and indeed, if, say, winter use only is required, the valve 11A can be eliminated and be replaced by a channel at the lower end of the insulator 5A.

A trap 40 can be used instead of the vent 10A to prevent liquid evaporation; it can have a mesh 41 saturated with a liquid or a heavy liquid such as liquid mercury can be used. The system 101A also includes a heat exchange mechanism that includes the second fluid 4A (which can be gas or liquid) which is caused to flow adjacent to the second section $6A_2$ to exchange energy with the liquid 3A in said second section. The system 101A further includes a non-thermal fluid pump 12A and a heat exchanger and/or storage chamber 13A. As already noted, in the system 101A the panel 1A is shown oriented vertically but it need only have a vertical component which is, in fact, the case of the panel 1 in FIG. 1.

In the system 101 in FIG. 1, the second fluid is a liquid (e.g., water) and the exchange is a liquid-to-liquid exchanger. The system 101 is a retrofit structure wherein the panel 1 is attached to the inclined roof of an existing building. The system herein disclosed is one that is particularly well adapted to permit retrofitting for incremental heat gains for the building itself and/or for units within or associated with the building (e.g., hot water heaters, swimming pools, etc.). The panel 1 is made structurally rigid to allow installation on the inclined roof as shown and the amount and thus the weight of the liquid 3A is minimized by the use of the second fluid. Employing the two separated fluids permits the use of an antifreeze if required in the first fluid 3A, whereas the second fluid can be water. The use of the two separate fluids also permits the thermic panel 1 to be separated from the parts of the building heating system; but, conceptually, the second section $6A_2$ can be some heat exchanger in the building or storage, assuming the freezing problem is taken care of, as is the case in the sandwich structure later described in connection with FIG. 5. The flat chambers marked $6_1$ and $6_2$ in FIGS. 1 and 2 correspond to the sections $6A_1$ and $6A_2$, respectively, in FIG. 3 and contain the liquid 3; they are separated by an isulator 5.

The collector panel 1 is attached to an existing roof 14 in FIG. 1 and connected to a heat exchanger 15 via holes drilled in the roof. The heat exchanger 15 can be a simple tube-in-tube exchanger which is sufficient for transferring the sun's heat to the hot water system of the house. The control box 2 in the convection loop of the liquid 3 produces the desired diode function, as before explained. The inner pipe marked 35 is part of the heat exchanger 15 and carries a liquid that exchanges heat with the liquid 3 carried within the annular chamber $6_2$.

In the retrofitted system, the water can be preheated by solar energy before going to a conventional hot water furnace. Incremental storage capabilities in the form of retroffited remote water tanks can be added to give night-time use of solar energy.

Figure 2:
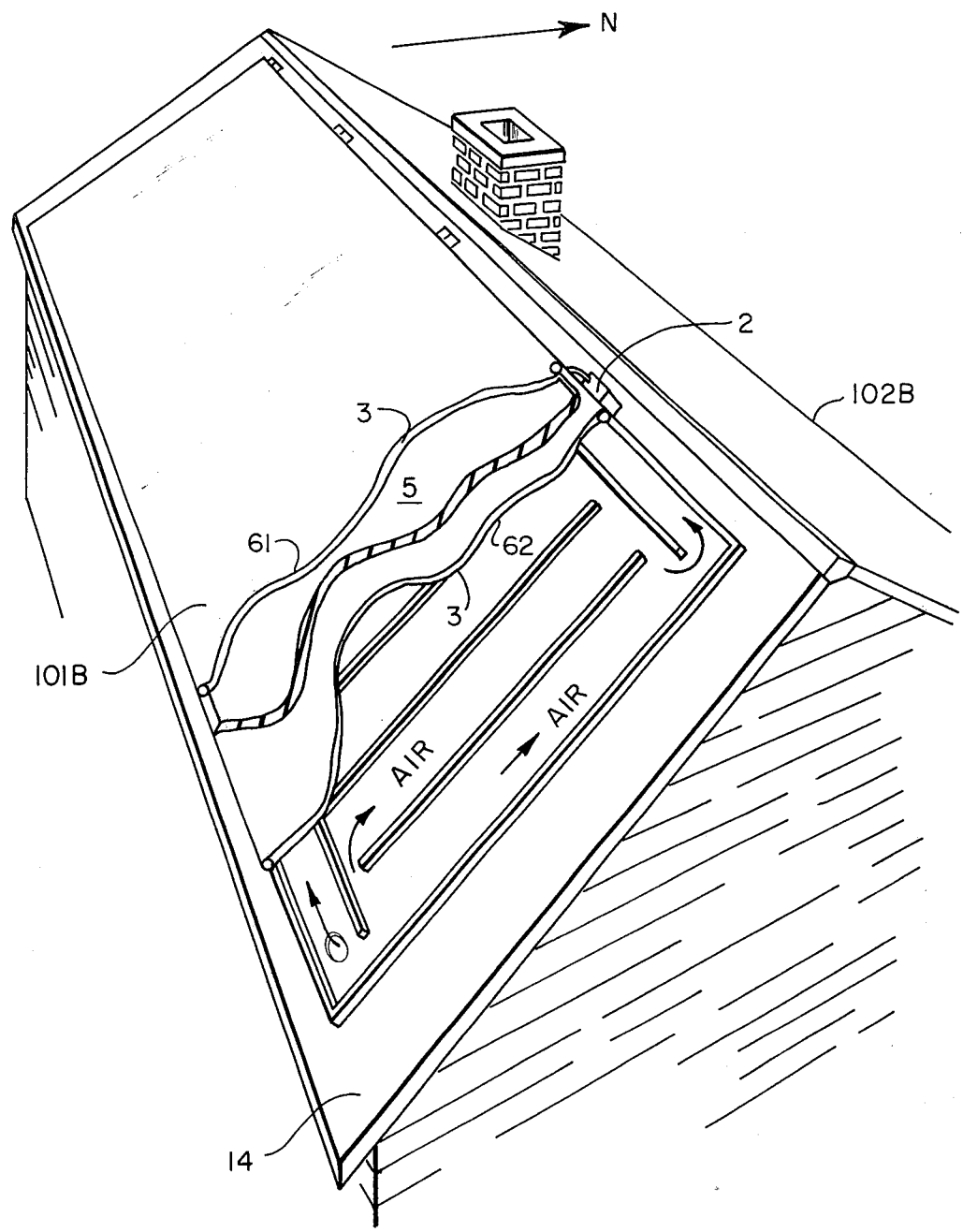
FIG. 2 shows a modification of the system of FIG. 1.

The system shown at 101B in FIG. 2 is similar to that in FIG. 1 except that the second fluid 4A in FIG. 3 is, in the system of FIG. 2, air that exchanges energy with the liquid 3 in the section $6_2$; the system 101B is retrofitted upon the roof of an existing building 102B. A certain small amount of heat storage is effected by the existing roof, but if, for example, panels like the panel 1 are placed adjacent to brick side walls of an existing building, the bricks can serve as meaningful storage elements in an appropriately designed system.

Figure 4:
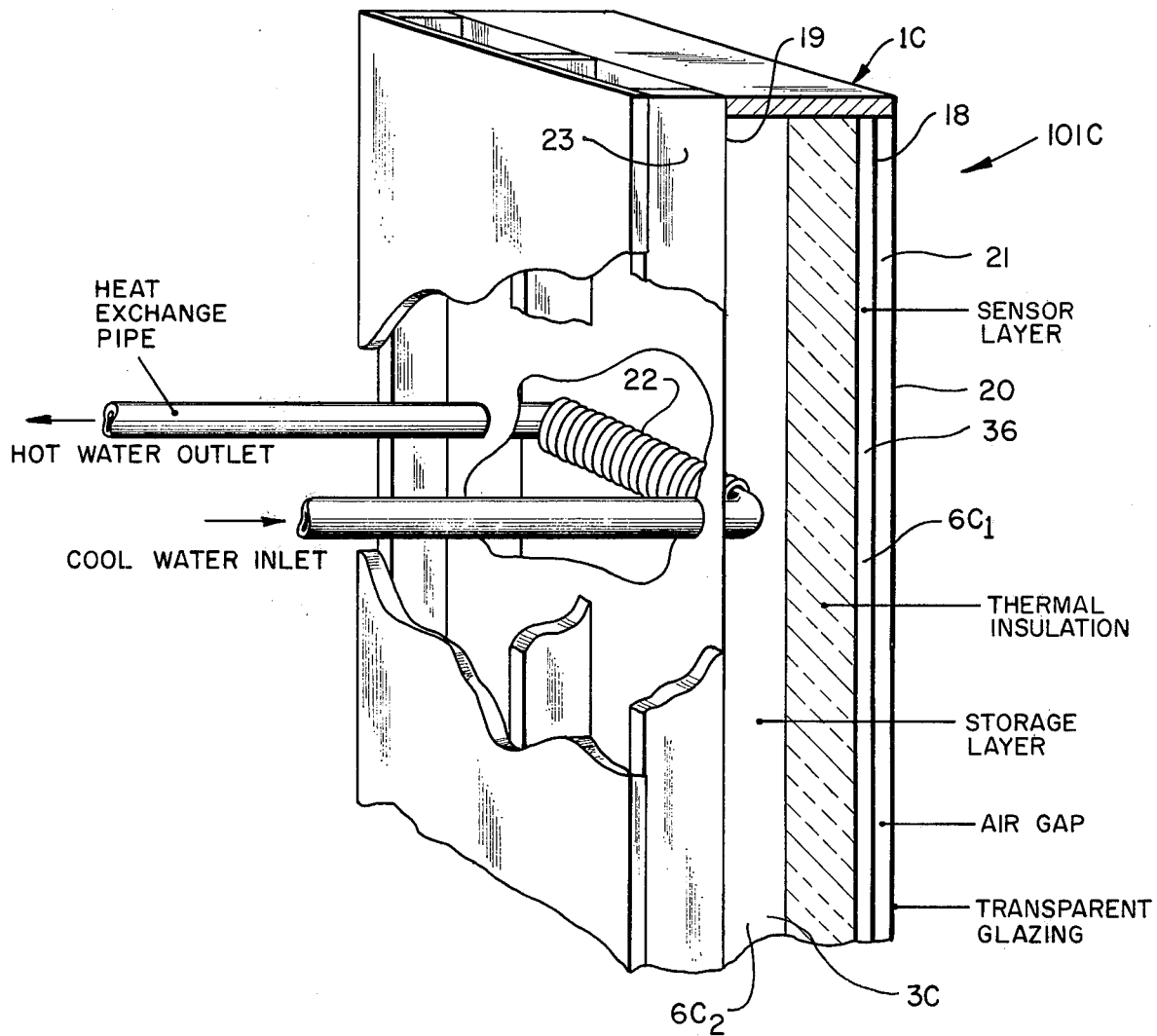
FIG. 4 is an isometric view, partly cutaway and partly in section, of a modified form of the invention.

The system labeled 101C in FIG. 4 is a modified version of the system 101A and is used for hot water heating. Similar numbering to that used in FIG. 3 is employed in FIG. 4; thus, for example, the collector panel in FIG. 4 is designated 1C. A one-way valve (not shown), like the valve 2A, is implied in FIG. 4 to permit one-way flow of a liquid 3C from a first section 6C, to a second section $6C_2$, as before, when the liquid in first sedction is hotter than that in the second section. The system 101C contains few parts that differ from the system 101A: namely, a transparent glazing 20 separated by an airspace 21 from the section $6C_1$, a liquid-to-liquid heat exchanger 22 and an insulator 23. The outer walls of the sections $6C_1$ and $6C_2$ are marked 18 and 19, respectively, and the wall 18 should be transparent. The glazing 20 and airspace 21 on a sunny day can result in water temperatures in the section $6C_1$ that approach the boiling temperatures and can exceed it if precautions are not taken.

Figure 5:
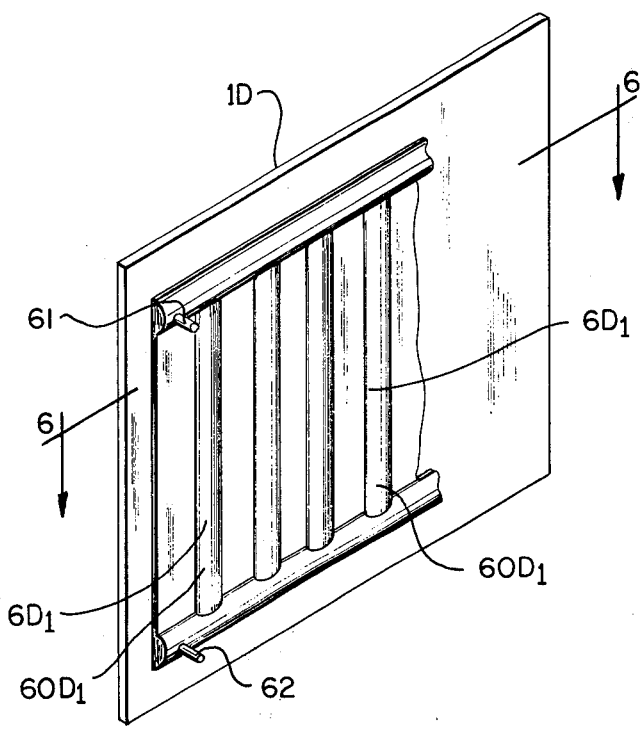
FIG. 5 is an isometric view showing a modification of part of a system like that of FIGS. 1 and 2.
Figure 6:
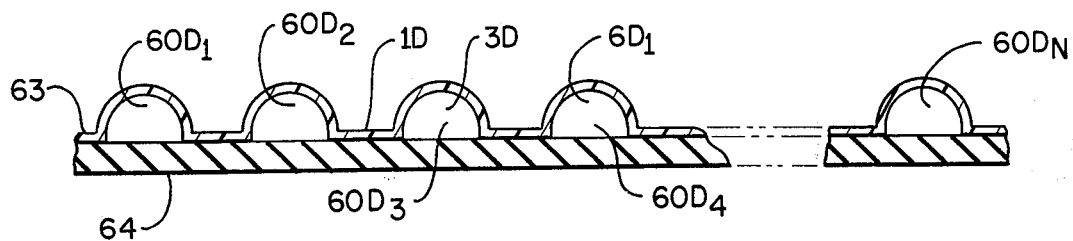
FIG. 6 is a section view taken upon the line 6—6 in FIG. 5 and looking in the direction of the arrows.

The liquid valves 2A and 11A can be various valves described in detail in said application Ser. No. 588,093, which include bellows activated valves, selectively permeable foam insulators at the bottom or top of the thermal insulator 5A, uni-directional flap valves, gas bubble valves, bimetallic strips, etc., and several valves can be employed in a single panel and logically activated to provide AND and/or OR functions. Mention is made previously herein that if the fluid 3A in FIG. 3 is water, some provision must be made, in a cold climate installation, for freezing. One such arrangement is shown in FIGS. 5 and 6 which show the outer section labeled $6D_1$ of a panel 1D. The section $6D_1$ comprises vertical channels $60D_1, 60D_2 \ldots 60D_N$ that are joined by headers at the top and bottom thereof, the headers have outlet pipes 61 and 62 for connection to the rest of a system. The section $6D_1$ is a stamped metal sheet on the outside with a flexible (e.g., rubber) backing 64 to prevent rupture of the water or other liquid marked 3D, should it freeze. Also, the outer panel can be made of a single material adapted to withstand expansion due to freezing.

Further modifications of the invention herein disclosed will occur to persons skilled in the art and all such modifications are deemed to be within the spirit and scope of the invention as defined by the appended claims.

What is claimed is:

1. Apparatus for controlling energy transmission between two closely-spaced regions in a system, that comprises: an isolating structure disposed in the space between the two closely-spaced regions, a liquid disposed within said structure and adapted to flow or move therein, control means other than the character of the liquid itself responsive to a temperature parameter of the system and using only thermal energy acting to control automatically the movement of the liquid flow in said structure, said liquid, mostly by virtue of the convective properties of the liquid, using only thermal energy and without change of state thereof, acting to modulate the energy transmission between the two closely-spaced regions of the system, said isolating structure comprising a thermal insulator interposed between the two regions and serving to divide the isolating structure into a first section adjacent the first region of the two regions and a second section adjacent the second region of the two regions, said liquid being disposed within the first section and the second section and adapted to flow by convective flow from one to the other of the two sections, the control means acting to affect said convective flow; and a heat transfer mechanism that comprises fluid means whereby a fluid is caused to flow adjacent to said second section to exchange energy with the liquid in said second section.

2. Apparatus as claimed in claim 1 in which the temperature parameter is a temperature difference between the two regions, the control means being responsive to said temperature difference and acting in response thereto to regulate said convective flow to permit said convective flow to occur in one direction within the panel but to obstruct convective flow in the opposite direction.

3. Apparatus as claimed in claim 2 wherein said control means is a one-way valve operatively disposed to be responsive only to a buoyancy-induced difference in pressure in the liquid between the two sections and not to the absolute pressure of the liquid in the two sections.

4. Apparatus as claimed in claim 3 wherein said one-way valve comprises a duct extending into the liquid in each section, each duct being long enough for each duct entrance to be at all times below the surface of the liquid in each section.

5. Apparatus as claimed in claim 4 wherein said isolating structure is adapted to allow expansion but not leakage of the liquid.

6. Apparatus as claimed in claim 5 wherein there is provided a vent between one said section and the atmosphere.

7. Apparatus as claimed in claim 6 having means to prevent evaporation of the liquid.

8. Apparatus as claimed in claim 7 wherein said means to prevent is a liquid trap having an obstruction therein for small pressure differences but no obstruction for large pressure differences.

9. Apparatus as claimed in claim 7 wherein said means to prevent is a porous member saturated with a liquid with high surface tension.

10. Apparatus as claimed in claim 4 wherein said isolating structure is made flexible to permit said expansion.

11. Apparatus as claimed in claim 4 wherein there is provided a gas chamber in one said section to permit said expansion of the fluid.

12. Apparatus as claimed in claim 2 wherein said first region is the outside environment and wherein said first section that contains the liquid adjacent said outside environment has flexible walls to prevent fracture thereof in the event of freezing of the liquid.

13. Apparatus as claimed in claim 12 wherein said walls comprise a composite structure that includes a metal sheet with channels to receive the liquid, said sheet being secured to flexible backing means to allow expansion of the contained liquid without fracture.

14. Apparatus as claimed in claim 1 wherein said fluid means is a gas and which includes means to force flow of the gas in thermal contact with said second section.

15. Apparatus wherein the isolating structure of claim 14 forms at least part of the outer surface of a building and is employed to transfer energy between the interior of the building and the outside environment.

16. Apparatus as claimed in claim 14 wherein there is an intermediate wall between the isolating structure and the interior of the building, which intermediate wall serves as an energy storage medium.

17. Apparatus as claimed in claim 1 wherein the isolating structure is oriented so as to have a vertical component of orientation, in which the thermal insulation is impenetrable to the liquid at all portions thereof except at its top or upper portion and at its bottom or lower portion, one of the upper portion and the lower portion being selective by virtue of said control means in permitting the liquid to pass through the particular portion when moving from one section to the other section.

18. Apparatus as claimed in claim 17 wherein said control means comprises liquid valve means operatively disposed to effect selective directional flow of the liquid through the upper and lower portions to permit flow of the liquid between the two sections to be in one direction in the summer and in the other direction in the winter.

19. Apparatus as claimed in claim 1 wherein said fluid means comprises a second liquid and which includes means to force the flow of the second liquid in thermal contact with said second section.

20. Apparatus wherein the isolating structure of claim 19 forms at least part of the outer surface of a building and which is employed to transfer energy between the interior of the building and the outside environment.

21. A method of controlling energy transmission between two closely-spaced regions in a system, that comprises: interposing a liquid in the space between the two regions; effecting movement of the liquid in said space on the basis of a temperature parameter in the system, said temperature parameter acting to modulate automatically the direction and/or the rate of liquid flow in said space by a mechanism other than the character of the liquid itself, said mechanism being in physical contact with the liquid, and said liquid mostly by virtue of the convective properties of the liquid and without change of state thereof, acting to modulate the energy transmission between the two closely-spaced regions of the system, and introducing a fluid into the system to flow adjacent to the liquid and exchange energy therewith.

* * * * *

UNITED STATES PATENT AND TRADEMARK OFFICE
CERTIFICATE OF CORRECTION

PATENT NO. : 4,050,508
DATED : September 27, 1977
INVENTOR(S) : BRUCE SHAWN BUCKLEY It is certified that error appears in the above-identified patent and that said Letters Patent are hereby corrected as shown below:

COLUMN 1, after title of the invention, add:

--GOVERNMENT RIGHTS

The Government of the United States of America has rights in this invention under an agreement that is based on National Science Foundation Grant No. GI-43897 to the Massachusetts Institute of Technology.--

Signed and Sealed this

Ninth Day of December 1980

[SEAL]

Attest:

SIDNEY A. DIAMOND

Attesting Officer

Commissioner of Patents and Trademarks

Notice of Adverse Decision in Interference

In Interference No. 100,232, involving Patent No. 4,050,508, B. S. Buckley, CONTROLLABLE HEAT TRANSMISSION PANELS, final judgment adverse to the patentee was rendered Jan. 21, 1983, as to claims 16 and 18.
[*Official Gazette July 12, 1983.*]